(12) United States Patent
Sukegawa et al.

(10) Patent No.: US 7,983,832 B2
(45) Date of Patent: Jul. 19, 2011

(54) CONTROL METHOD OF DIRECT INJECTION ENGINE, CONTROLLER FOR IMPLEMENTING THE CONTROL METHOD, AND CONTROL CIRCUIT DEVICE USED FOR THE CONTROLLER

(75) Inventors: Yoshihiro Sukegawa, Hitachi (JP); Hiroshi Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 819 days.

(21) Appl. No.: 11/956,040

(22) Filed: Dec. 13, 2007

(65) Prior Publication Data
US 2008/0208438 A1    Aug. 28, 2008

(30) Foreign Application Priority Data

Feb. 28, 2007 (JP) ................................ 2007-048360

(51) Int. Cl.
*B60T 7/12* (2006.01)
(52) U.S. Cl. ......... 701/105; 123/434; 123/698; 123/531
(58) Field of Classification Search .................. 123/294, 123/305, 357, 381, 406.55, 434, 679, 698, 123/516, 518, 531; 701/103, 104, 105
See application file for complete search history.

(56) References Cited

U.S. PATENT DOCUMENTS

| 6,513,488 B2 | 2/2003 | Enoki et al. | |
| 6,941,929 B2 * | 9/2005 | Shinzawa | 123/357 |
| 2004/0000275 A1 * | 1/2004 | McIntyre et al. | 123/1 A |
| 2004/0074471 A1 * | 4/2004 | Watanabe et al. | 123/305 |
| 2006/0016425 A1 * | 1/2006 | Kono et al. | 123/305 |

FOREIGN PATENT DOCUMENTS

| JP | 9-280092 A | 10/1997 |
| JP | 2002-89324 A | 3/2002 |
| JP | 2006-90202 A | 4/2006 |
| JP | 2007-32326 A | 2/2007 |

OTHER PUBLICATIONS

Japanese Office Action dated Jun. 2, 2009 (two (2) pages).

* cited by examiner

*Primary Examiner* — John T Kwon
(74) *Attorney, Agent, or Firm* — Crowell & Moring LLP

(57) ABSTRACT

An object of the present invention is to provide a fuel injection control technique which maximizes engine power according to fuel evaporation characteristics. The fuel injection timing in the intake stroke is delayed according as a physical quantity affecting the fuel evaporation time changes such that the fuel evaporation time decreases. Further, the fuel injection timing when a physical quantity affecting the fuel evaporation time is such that the fuel evaporation time decreases is set closer to the end of the intake stroke than the fuel injection timing when the physical quantity is such that the fuel evaporation time increases. The fuel injection timing is controlled so as to maximize engine power according to fuel evaporation times.

6 Claims, 19 Drawing Sheets

INTAKE STROKE

FIG. 26
TUMBLE CONTROL VALVE OPEN
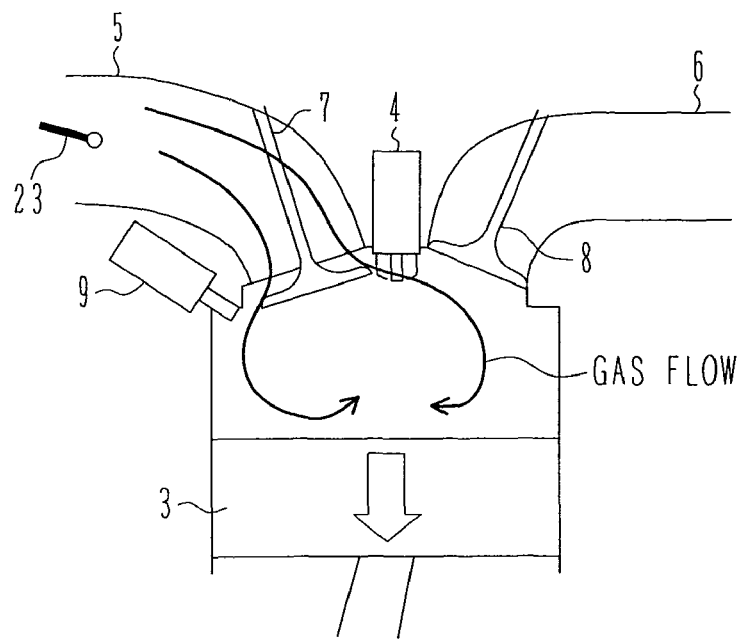
TUMBLE CONTROL VALVE CLOSED
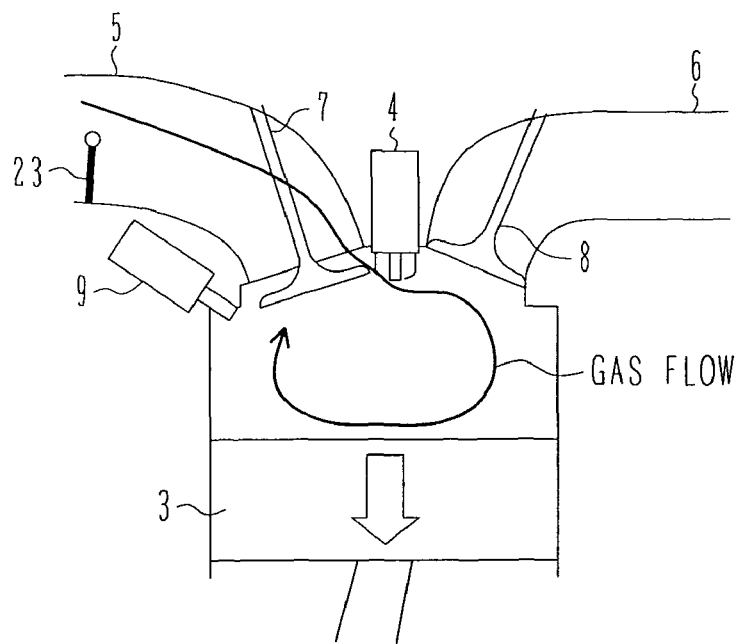

CONTROL METHOD OF DIRECT INJECTION ENGINE, CONTROLLER FOR IMPLEMENTING THE CONTROL METHOD, AND CONTROL CIRCUIT DEVICE USED FOR THE CONTROLLER

BACKGROUND OF THE INVENTION

1. Field of the Invention

The present invention relates to a control method of an engine with direct fuel injection into the cylinder (so-called a direct injection engine) and more particularly to a control method of an injector which injects fuel into the cylinder. The invention is also related to a controller for implementing the control method or a control circuit device used for the controller.

2. Description of the Related Art

When an engine is started up in a cold state, a catalyst provided in an exhaust gas passage cannot be activated sufficiently because of the low temperature thereof. Accordingly, unburnt gas is discharged from the engine as it is, which will significantly affect the environment.

To reduce the amount of unburnt hydrocarbon (HC) discharged immediately after a cold start of an engine, it is conventionally proposed that fuel injection is performed at a later stage of the compression stroke and ignition performed after the T.D.C. This allows the air-fuel mixture in the cylinder to combust in a middle or later stage of the expansion stroke. As a result, the exhaust gas temperature rises activating the catalyst at an early stage. In the case of heavy fuels, the degradation of combustion stability is restrained by correcting an advance angle for the fuel injection timing and ignition timing at a later stage of the compression stroke. Further, a technique for changing the fuel injection timing according to fuel evaporation characteristics in a direct injection engine is disclosed, for example, in JP-A-2006-90202.

SUMMARY OF THE INVENTION

However, the above-mentioned conventional technique describes a technique for performing fuel injection control according to fuel evaporation characteristics to achieve exhaust gas reduction but does not take into consideration the relationship between the fuel injection control for exhaust gas reduction and the improvement of engine power.

With a direct injection engine, gas in the cylinder is cooled by the evaporation latent heat of fuel resulting in improved volumetric efficiency and higher engine power. That is, since the direct injection engine aims at improving engine power by use of fuel evaporation, the fuel injection control according to fuel evaporation characteristics is necessary to obtain higher engine power.

Then, an object of the present invention is to provide a fuel injection control technique which makes it possible to maximize engine power according to fuel evaporation characteristics.

In order for the present invention to accomplish the above-mentioned object, the fuel injection timing in the intake stroke is delayed according as a physical quantity affecting the fuel evaporation time changes in such a way to decrease the fuel evaporation time.

Further, the above-mentioned object is accomplished by setting the fuel injection timing when a physical quantity affecting the fuel evaporation time is such that the fuel evaporation time decreases closer to the end of the intake stroke than the fuel injection timing when the physical quantity is such that the fuel evaporation time increases.

A specific configuration will become apparent from the embodiments described below.

In accordance with the thus-configured present invention, gas in the cylinder is appropriately cooled by the evaporation latent heat of fuel resulting in improved volumetric efficiency and higher engine power, making it possible to improve the power of a direct injection internal combustion engine.

BRIEF DESCRIPTION OF THE DRAWINGS

FIG. 26 is a diagram showing air flow conditions in a combustion chamber according to the eighth embodiment.

DETAILED DESCRIPTION OF THE PREFERRED EMBODIMENTS

Figure 1:
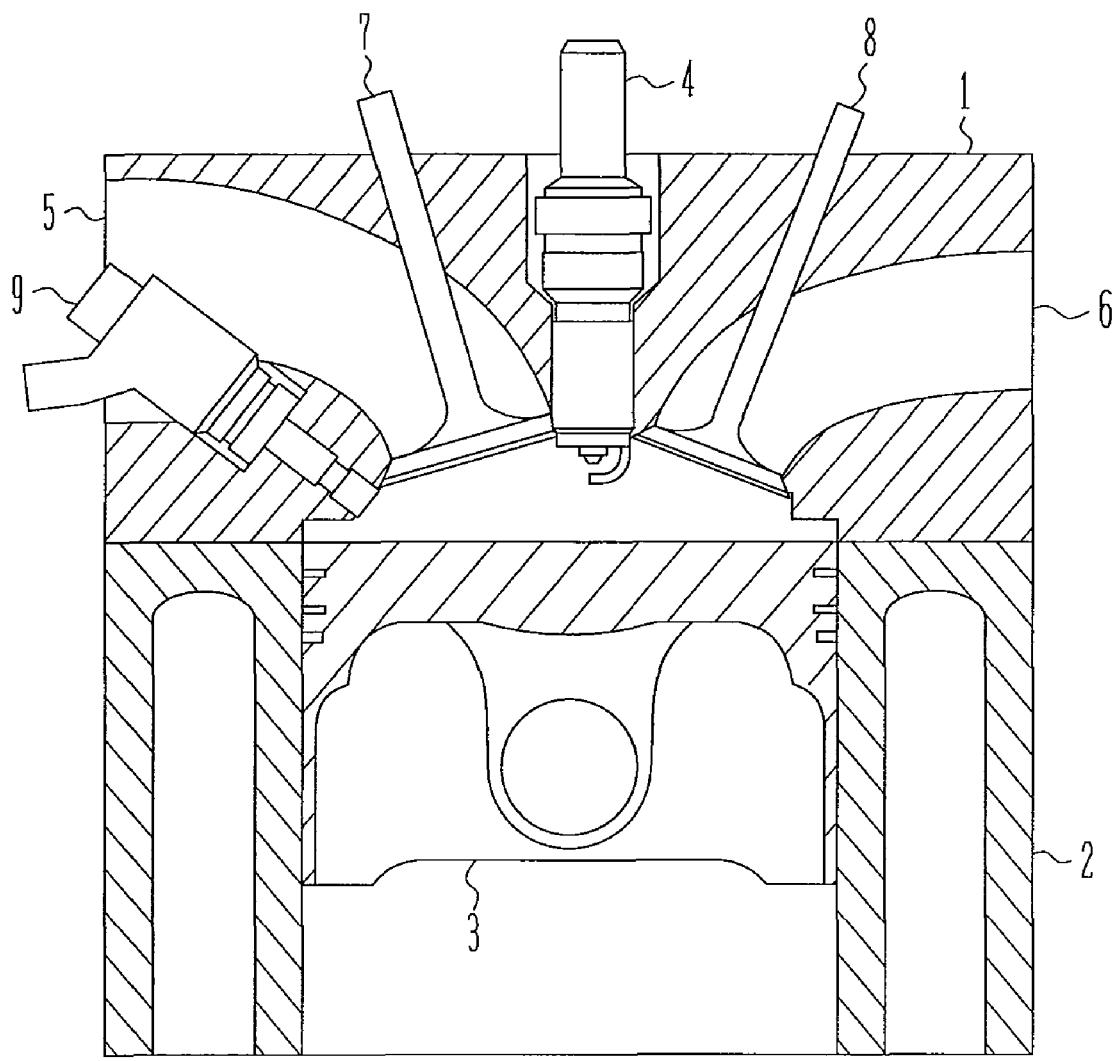
FIG. 1 is a plan view of an engine according to a first embodiment.

The present invention will be explained below based on embodiments with reference to the accompanying drawings.

Features of the present embodiments will be shown below.

1) A direct injection engine with direct fuel injection into the cylinder, wherein the fuel injection timing in the intake stroke is delayed according as a parameter affecting the fuel evaporation time changes in such a way to decrease the fuel evaporation time.

2) A direct injection engine with direct fuel injection into the cylinder, wherein the fuel injection timing in the intake stroke when a parameter affecting the fuel evaporation time is such that the fuel evaporation time decreases is made later than the fuel injection timing in the intake stroke when the parameter is such that the fuel evaporation time increases.

3) A direct injection engine with direct fuel injection into the cylinder, wherein, during the operation with a throttle valve fully opened, the fuel injection timing in the intake stroke is delayed according as a parameter affecting the fuel evaporation time changes in such a way to decrease the fuel evaporation time.

4) A direct injection engine with direct fuel injection into the cylinder, wherein, during the operation with the fully-opened throttle valve, the fuel injection timing in the intake stroke when a parameter affecting the fuel evaporation time is such that the fuel evaporation time decreases is made later than the fuel injection timing in the intake stroke when the parameter is such that the fuel evaporation time increases.

5) The fuel injection timing in the intake stroke is delayed with increasing engine cooling water temperature.

6) The fuel injection timing in the intake stroke is delayed with increasing fuel temperature.

7) The fuel injection timing in the intake stroke is delayed with increasing outside air temperature.

8) Within a predetermined time, the fuel injection timing in the intake stroke is delayed with increasing elapsed time from the engine start.

9) The fuel injection timing in the intake stroke is delayed according as the opening of a tumble control valve or a swirl control valve changes so as to intensify the tumble flow or swirl flow in the cylinder.

10) The fuel injection timing in the intake stroke is delayed with increasing fuel pressure.

11) A direct injection engine with direct fuel injection into the cylinder, wherein means for detecting a fuel evaporation time is provided; and wherein the fuel injection timing in the intake stroke is delayed with increasing fuel evaporation time detected by the detection means.

12) A direct injection engine with direct fuel injection into the cylinder, wherein means for determining fuel lightness is provided; and wherein the fuel injection timing in the intake stroke is delayed with increasing fuel lightness detected by the fuel lightness determination means.

13) A direct injection engine with direct fuel injection into the cylinder, wherein means for detecting fuel components and means for estimating the fuel evaporation time based on a result of the detection means are provided; wherein, when the fuel evaporation time detected by the estimating means is higher than a predetermined reference evaporation time, the fuel injection timing in the intake stroke is made later than predetermined reference injection timing; and wherein, when the fuel evaporation time detected by the estimating means is lower than a predetermined reference evaporation time, the fuel injection timing in the intake stroke is made earlier than predetermined reference injection timing.

In accordance with the thus-configured embodiments, gas in the cylinder is appropriately cooled by the evaporation latent heat of fuel, resulting in improved volumetric efficiency and higher engine power. That is, the engine power can be improved by controlling the fuel injection timing so that an optimum condition of fuel evaporation is attained.

First Embodiment

Figure 2:
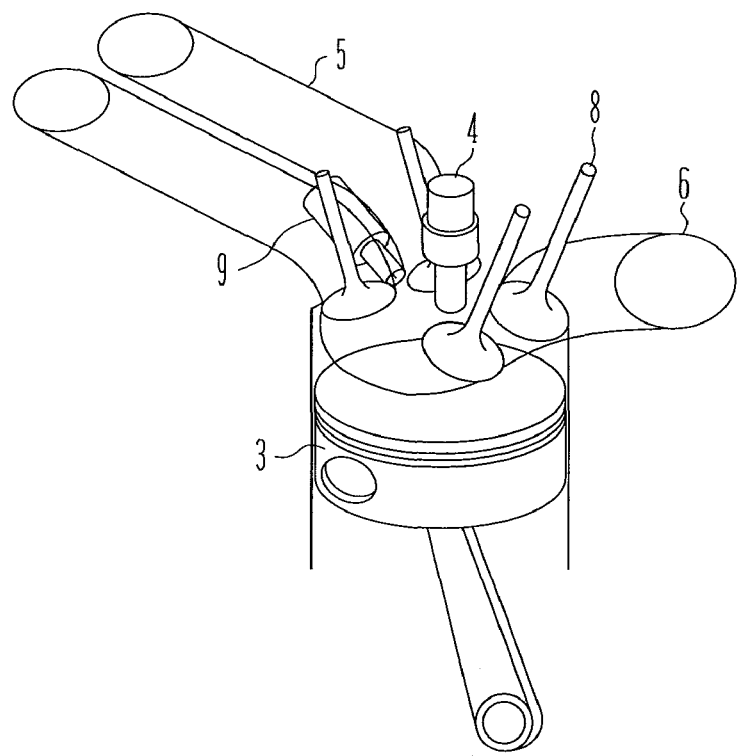
FIG. 2 is a perspective view of an engine according to the first embodiment.

Configurations of a direct injection engine according to a first embodiment are shown in FIGS. 1 and 2. FIG. 1 is a central sectional view of a direct injection engine according to the present embodiment, and FIG. 2 is a perspective view of the direct injection engine according to the present embodiment.

A combustion chamber is formed by a cylinder head 1, a cylinder block 2, and a piston 3 inserted in the cylinder block 2; an ignition plug 4 is provided at the top center of the combustion chamber. A intake pipe 5 and an exhaust pipe 6 open into the combustion chamber, which are provided with a intake valve 7 and an exhaust valve 8, respectively, to open and close each opening. An injector 9 is provided on the intake side of the combustion chamber so as to inject fuel directly into the combustion chamber.

The injector 9 used in the first embodiment injects fuel pressurized to about 10 to 20 MPa at a high speed from microscopic pores provided at the end of the nozzle of the injector 9 into the combustion chamber. The injector 9 can inject fuel at desired timing and at desired time intervals in response to a command received from an engine control unit (ECU) (not shown).

Figure 3:
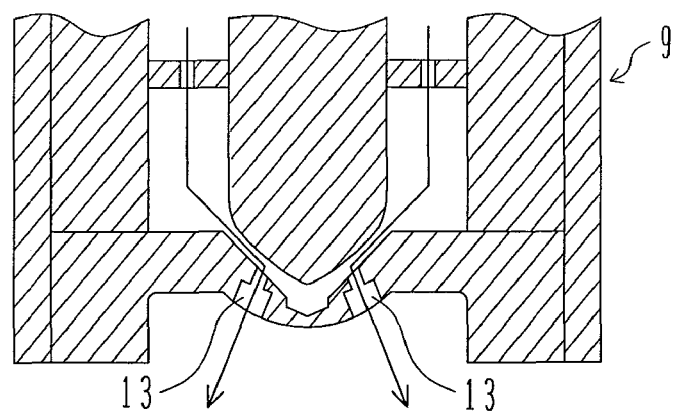
FIG. 3 is a sectional view of an injector end according to the first embodiment.
Figure 4:
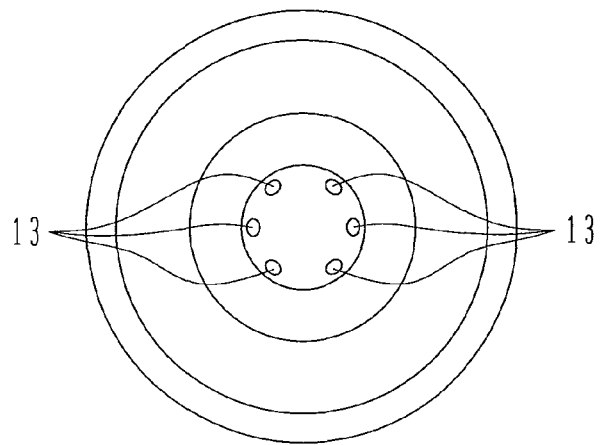
FIG. 4 is a plan view of an injector end according to the first embodiment.

A central sectional view of the nozzle of the injector 9 is shown in FIG. 3. A plain view of the nozzle of the injector 9 when viewed from below is shown in FIG. 4. Further, exemplary forms of fuel sprays injected from the injector 9 are shown in FIGS. 5 and 6.

As shown in FIGS. 3 and 4, a plurality of microscopic nozzle holes 13 are circumferentially formed at the end of the injector 9. Although six nozzle holes are provided by the present embodiment, the present invention is not limited to the number thereof. The diameter of an nozzle hole 13 is for example 100 to 200 µm. Fine fuel sprays having a Sauter mean diameter of about 5 to 20 micrometers are formed by injecting high-pressure fuel (for example, 10 to 20 MPa) from the microscopic nozzle holes. Fuel injection is started and ended by a solenoid, a piezoelectric element, a magnetostrictive element, etc. (not shown) vertically driving a valve in the injector 9.

Figure 5:
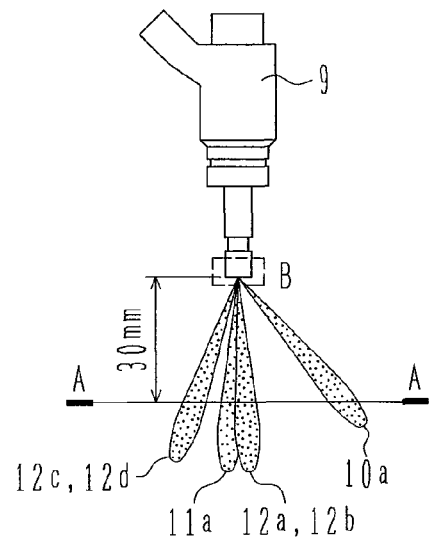
FIG. 5 is an external view of fuel sprays according to the first embodiment.
Figure 6:
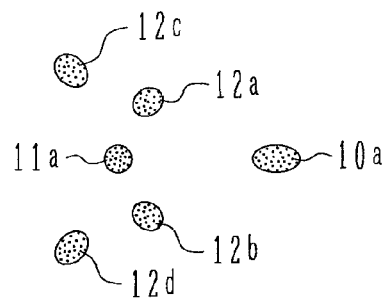
FIG. 6 is a sectional view of fuel sprays according to the first embodiment.

FIG. 5 shows exemplary outer appearances of fuel sprays injected into a static atmosphere, and FIG. 6 shows a sectional view of forms of fuel sprays taken along the A-A line of FIG. 5. As mentioned earlier, a plurality of nozzle holes 13 are circumferentially formed at the end of the injector 9; an upper fuel spray 10a, a center fuel spray 11a, and side fuel sprays 12a to 12d are formed from each nozzle hole. The injector 9 is provided so that the upper fuel spray 10a is on the ignition plug side.

With the present embodiment, the fuel injection timing is changed in diverse ways according to operating conditions of the engine. For example, immediately after a start of the engine, the engine temperature is low; accordingly, fuel injection is performed in the compression stroke in order to stabilize combustion. When the engine has warmed up, fuel injection is performed in the intake stroke in order to fully mix the fuel with air in the cylinder. Further, if engine load is comparatively small, in order to improve fuel efficiency, so-called stratified lean-burn combustion may be performed by injecting fuel in the compression stroke to concentrate fuel around the ignition plug even after the engine has warmed up. The fuel injection timing is suitably changed by the engine control unit (ECU) of the internal combustion engine so as to optimize fuel efficiency, exhaust gas, and engine power.

Figure 7:
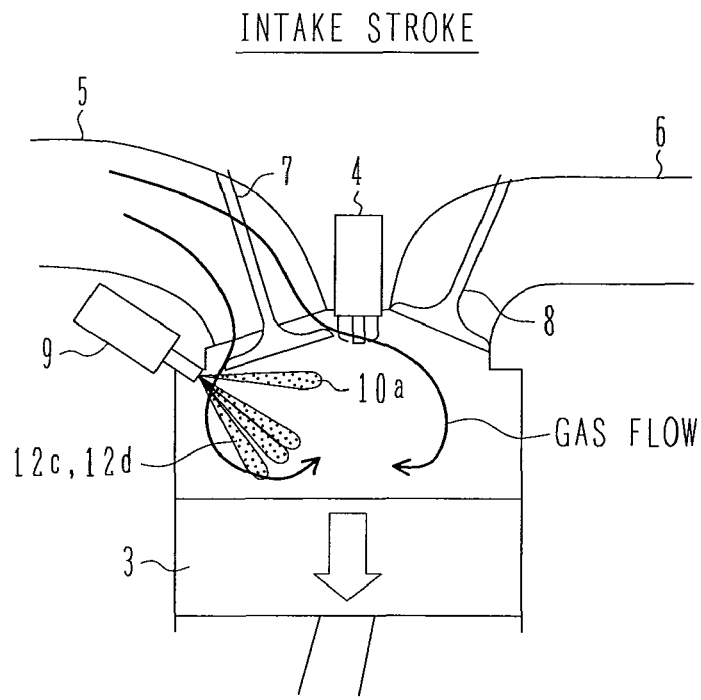
FIG. 7 is a diagram showing fuel spray conditions in a combustion chamber according to the first embodiment.
Figure 8:
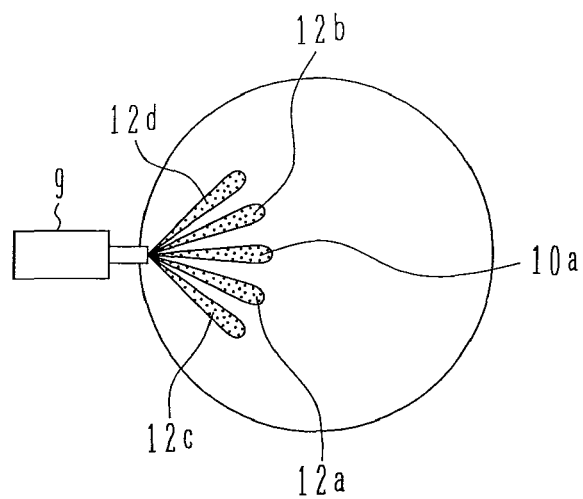
FIG. 8 is a diagram showing fuel spray conditions in a combustion chamber according to the first embodiment.

FIG. 7 shows forms of fuel sprays in the combustion chamber when fuel injection is performed in the middle of the intake stroke. The diagram shows a condition in the combustion chamber at 90 degrees ATDC where, for example, the engine rotational speed is 2000 r/min and the fuel injection start timing is 70 degrees after the intake T.D.C. (70 degrees ATDC). Further, FIG. 8 is a plan view showing a condition in the combustion chamber at the same timing as FIG. 7 when viewed from the top (ignition plug side).

Figure 9:
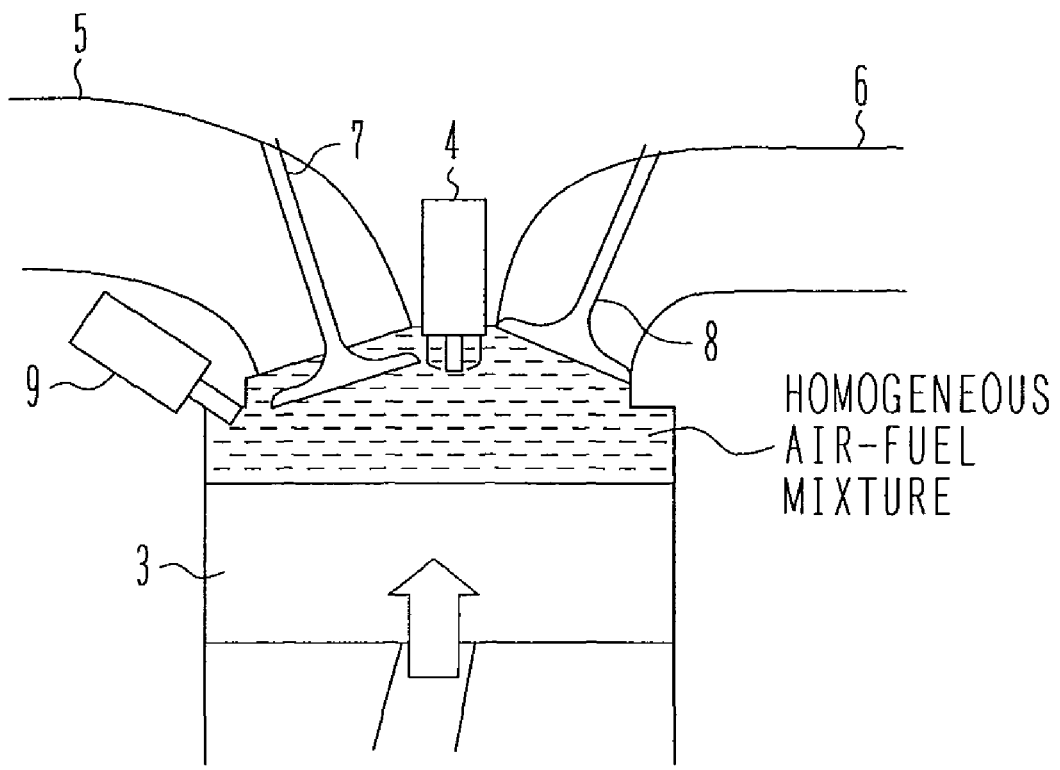
FIG. 9 is a diagram showing an air-fuel mixture condition in a combustion chamber according to the first embodiment.

The upper fuel spray 10a injected from the injector 9 is injected toward slightly below an electrode of the ignition plug 4, and the side sprays 12c and 12d are injected toward the intake side of the piston. With this spraying method, the fuel sprays do not easily impinge on the wall of the combustion chamber, for example, the engine head, the intake valve, the exhaust valve, the cylinder bore wall surface, piston surface, etc. Further, the fuel sprays are injected over a wide range, resulting in favorable dispersion thereof into the combustion chamber. If a fuel spray impinges on the wall surface, a liquid film is formed on the wall surface, resulting in a decreased evaporation time. If fuel sprays are not sufficiently dispersed in the combustion chamber, the concentration unevenness of an air-fuel mixture increases, which may cause incomplete combustion. The above-mentioned spraying method is intended to prevent these conditions. FIG. 9 shows a condition in the combustion chamber at a later stage of the compression stroke (for example, 40 degrees before the compression T.D.C.) following the condition of FIGS. 7 and 8. The fuel injected in the intake stroke immediately evaporates to mix with air during the same stroke. Then, an air-fuel mixture having almost uniform concentrations is formed at a later stage of the compression stroke. Then, before the compression T.D.C., the air-fuel mixture in the combustion chamber is ignited by the ignition plug to make combustion (not shown).

Figure 10:
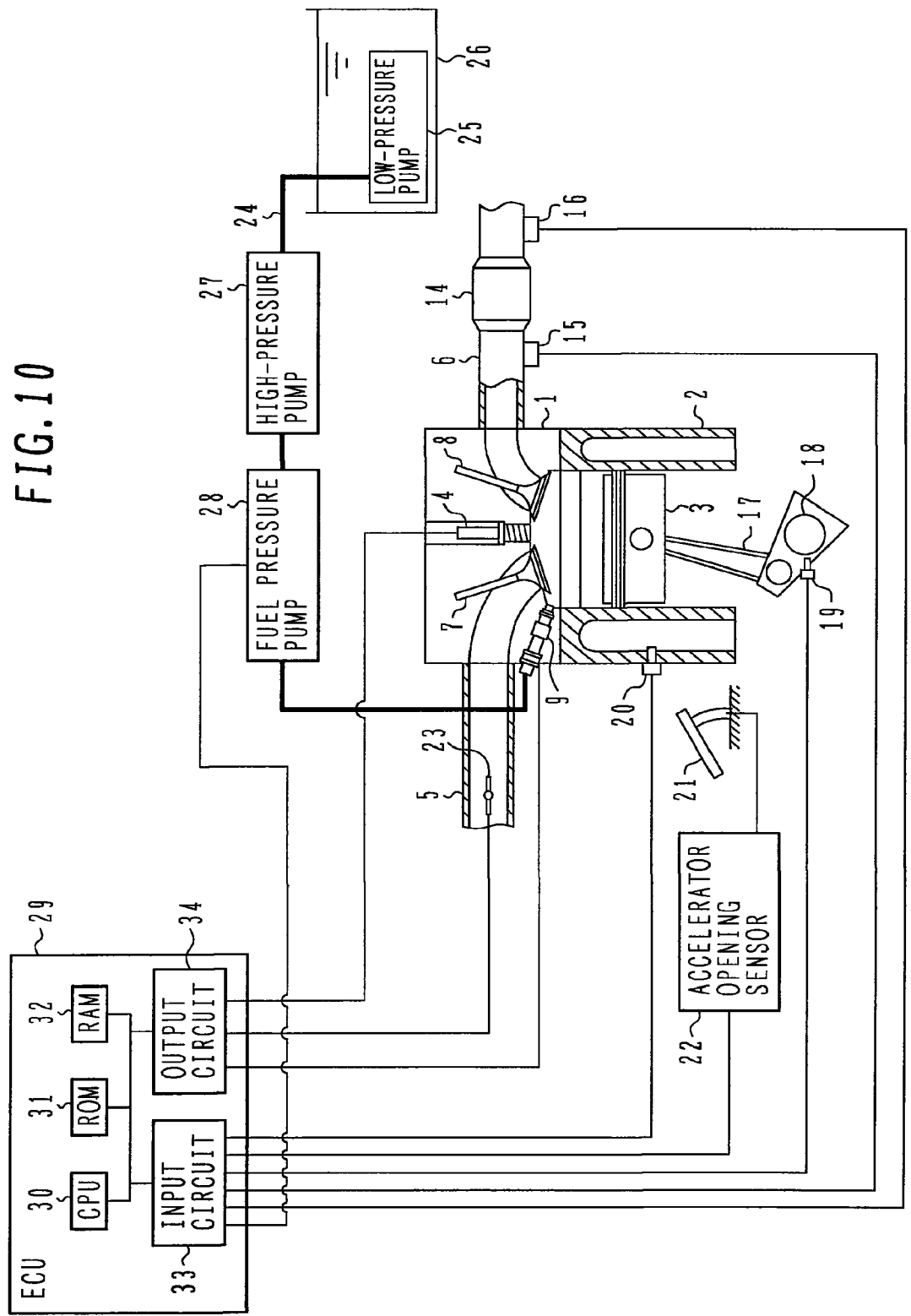
FIG. 10 is a block diagram of an engine according to the first embodiment.

FIG. 10 is a block diagram showing an overall configuration of the engine. The piston 3 is connected with a crankshaft 18 through a connecting rod 17. The crankshaft 18 is provided with a crank angle sensor 19 which can detect a crank angle and an engine rotational speed. The cylinder block 2 is provided with a water temperature sensor 20 which detects a cooling water temperature. An accelerator 21 is provided with an accelerator opening sensor 22 which detects the depressed amount of the accelerator by the driver. The intake pipe 5 is provided with a throttle valve 23 which can control the quantity of intake air. An air flow sensor (not shown) which can detect the quantity of intake air is provided on an upstream side of the intake pipe 5. The exhaust pipe 6 is provided with a three-way catalyst 14, an air-fuel ratio sensor 15 is provided on an upstream side thereof, and an O2 sensor 16 is provided on a downstream side thereof. A low-pressure pump 26 provided in a fuel tank 25 is connected to the injector 9 through a fuel pipe 24, and a high-pressure pump 27 which further pressurizes the fuel and a fuel pressure sensor 28 which can detect the fuel pressure are provided in the middle of the fuel pipe 24.

The engine control unit (ECU) 29 is composed of a central processing unit (CPU) 30 which performs calculation processing according to a set program; a read-only memory (ROM) 31 which stores a control program and data necessary for calculations; a random access memory (RAM) 32 which temporarily stores a calculation result; an input circuit 33 which receives signals from each sensor; and an output circuit 34 which transmits signals to each apparatus based on the calculation result.

Operations in the intake stroke injection mode according to the first embodiment will be explained below with reference to FIGS. 11 to 17.

Prior to the intake stroke injection mode, the lightness of the present fuel is to be obtained with various known methods disclosed, for example, in JP-A-9-151777. Here, the lightness refers to an index of the ease with which fuel evaporates and is defined as a numerical value that is proportional to the evaporation time (amount of fuel evaporation per unit time) thereof. For example, the lightness becomes 0 in the case of the heaviest gasoline and 1 in the case of the lightest gasoline; in the continuum between 1 and 0, the lightness takes a certain numerical value corresponding to the fuel evaporation time.

Figure 11:
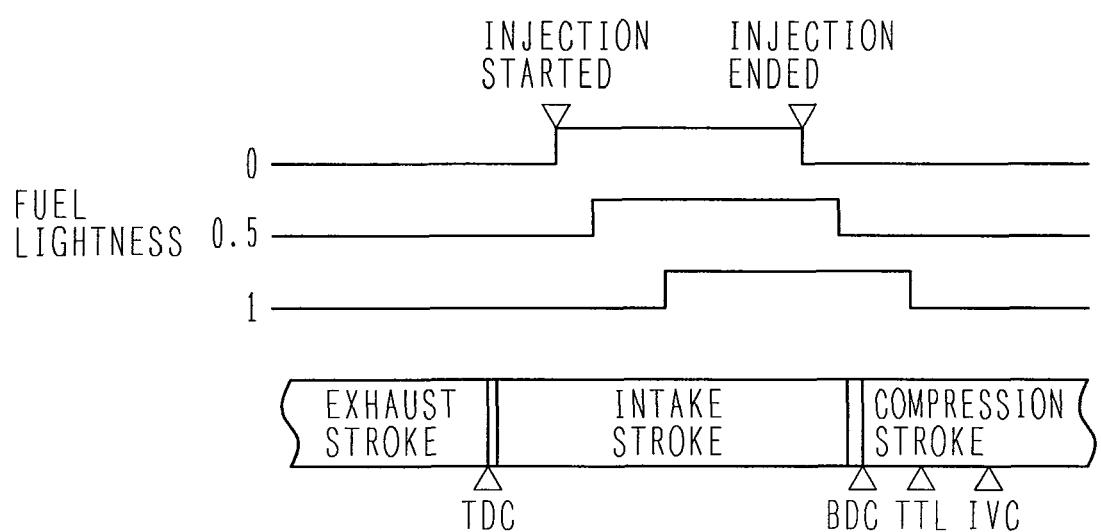
FIG. 11 is a diagram showing fuel injection timing according to the first embodiment.
Figure 12:
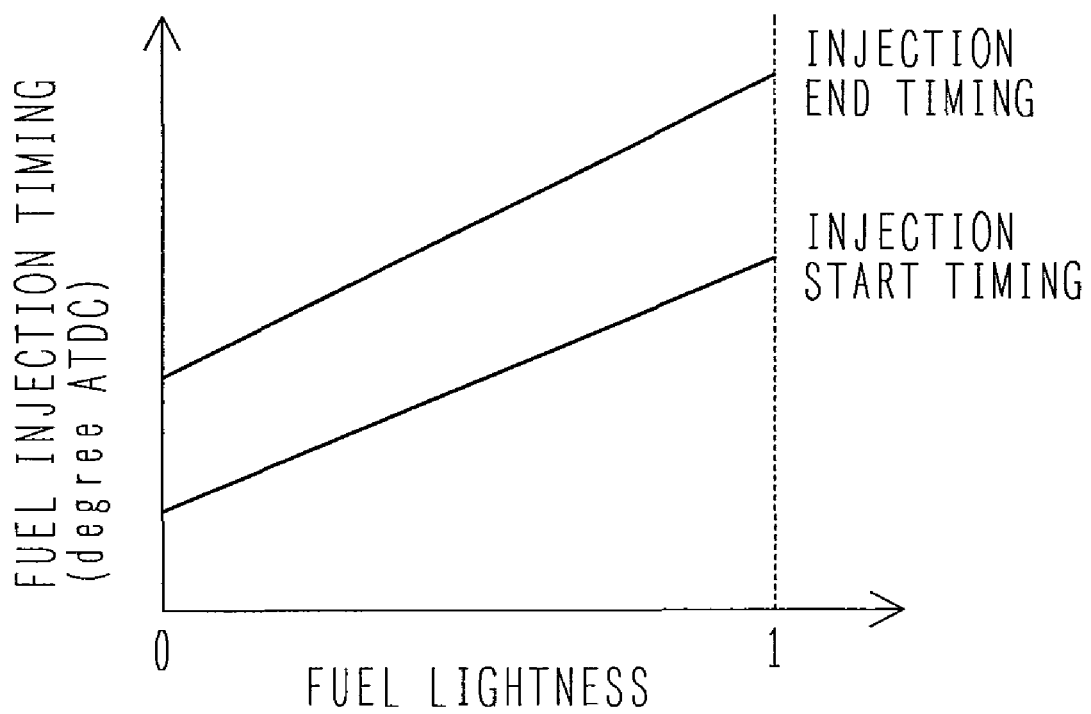
FIG. 12 is a graph showing the relation between fuel injection timing and fuel lightness according to the first embodiment.

Fuel injection timing in the intake stroke injection mode are shown in FIGS. 11 and 12. FIG. 11 is a fuel injection timing chart for each fuel lightness, and FIG. 12 is a graph showing a relation between fuel injection timing (fuel injection start and end timing) and fuel lightness.

In the intake stroke injection mode, fuel injection is started in the intake stroke and ended in the intake stroke or at an early stage of the compression stroke. In the present embodiment, the fuel injection timing in the intake stroke injection mode is changed according to the fuel lightness. Specifically, in the case of fuels having lower lightness (i.e., lower evaporation time), the fuel injection start and end timing is each made earlier; in the case of fuels having higher lightness or fuels which easily evaporate (i.e., higher evaporation time), the fuel injection start and end timing is each made later. In these cases, an interval between the fuel injection start and end timings (injection period) is determined so that the air-fuel ratio (i.e., a ratio of the air mass to be charged in the combustion chamber to the fuel mass to be injected therein) becomes a predetermined value (for example, 12 to 14.7).

Figure 13:
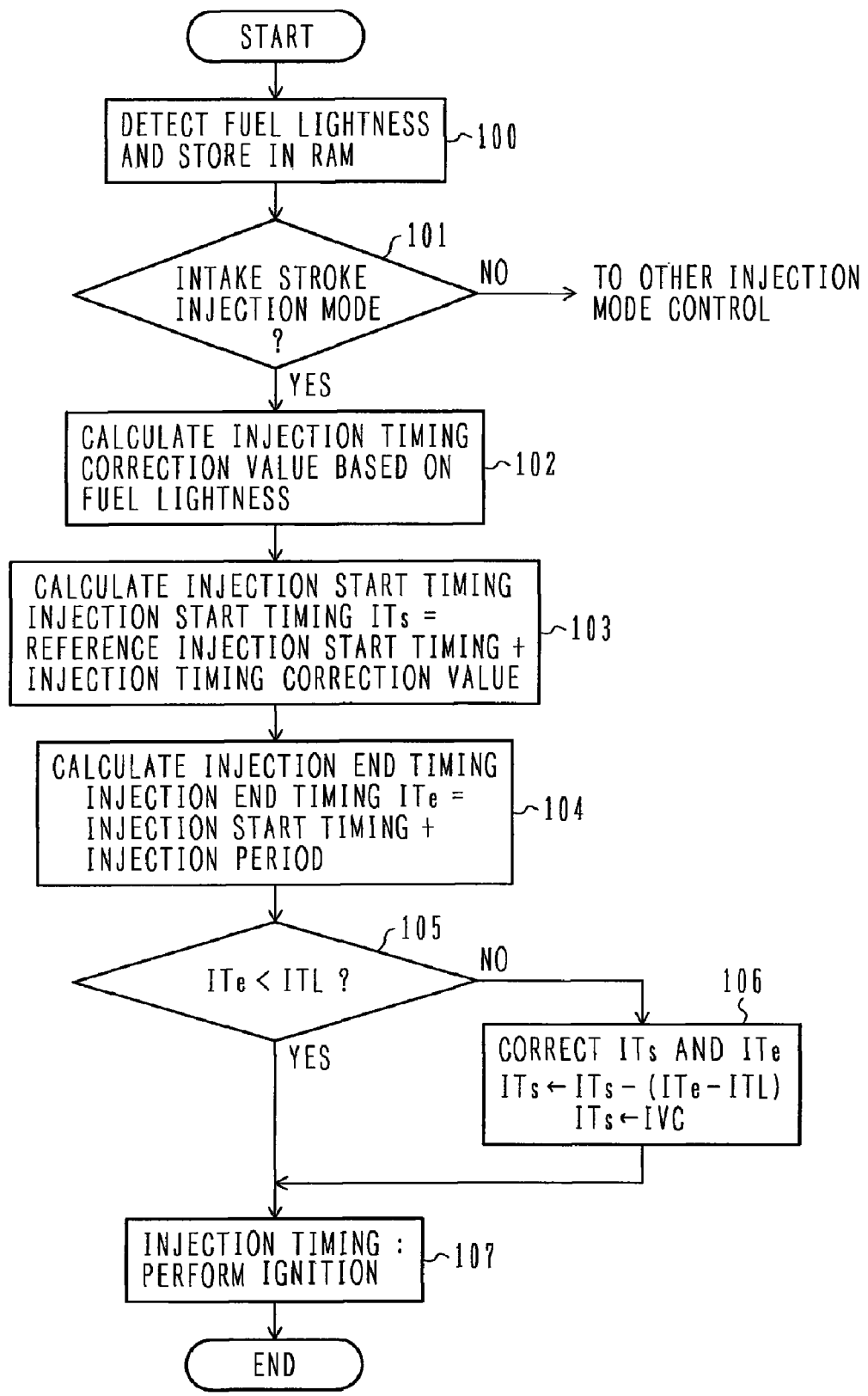
FIG. 13 is a flow chart of injection control according to the first embodiment.
Figure 14:
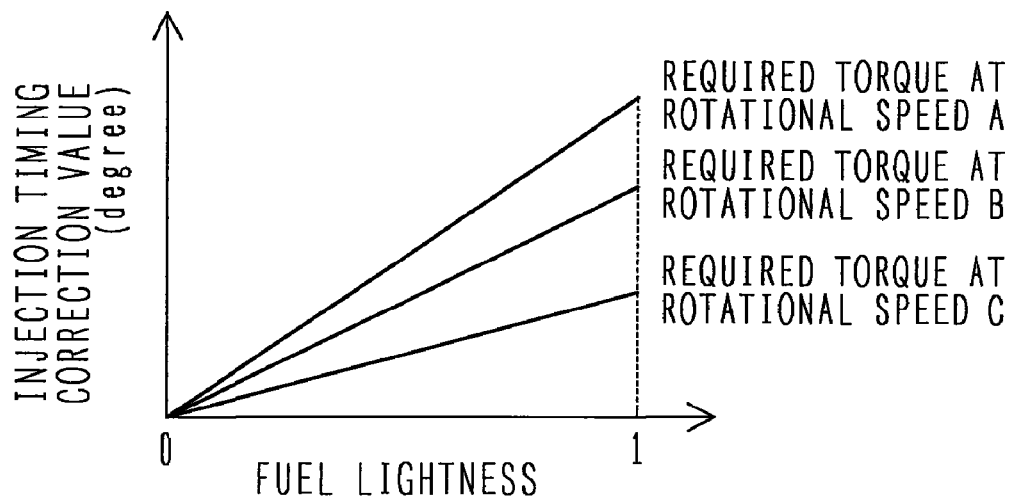
FIG. 14 is a graph showing the relation between fuel injection timing correction values and fuel lightness according to the first embodiment.

Procedures for determining the fuel injection timing in the intake stroke injection mode will be explained with reference to FIGS. 13 and 14. FIG. 13 is a flow chart showing the fuel injection timing determination procedures in the intake stroke injection mode.

Immediately after a start of the engine, the lightness of the present fuel is obtained with the above-mentioned known techniques (disclosed, for example, in JP-A-9-151777), and the lightness is then stored in the RAM of the ECU (processing 100).

Then, the ECU obtains a required torque for the engine from output values of the accelerator opening sensor, the crank angle sensor, etc. and then determines whether or not the present mode is the intake stroke injection mode based on various pieces of information, such as the required torque, a cooling water temperature detected by the water temperature sensor, etc. (processing 101).

When the present mode is judged to be the intake stroke injection mode in processing 101, the ECU obtains a fuel injection timing correction value based on the fuel lightness already stored in the RAM. As shown in FIG. 14, the fuel injection timing correction value corresponding to the fuel lightness is provided in advance as a table or function in the RAM of the ECU for each required torque and rotational speed of the engine. A fuel injection timing correction value corresponding to the present required torque and rotational speed is obtained by use of this table or function (processing 102).

Then, a fuel injection start timing ITs is obtained in processing 103. The fuel injection start timing ITs is obtained by adding the fuel injection timing correction value obtained in processing 102 to reference injection start timing corresponding to the present required torque and rotational speed. Here, the reference injection start timing, which is the injection start timing at which engine power is maximized when the fuel lightness is 0 (heaviest), is preset as a table or function in the RAM of the ECU for each required torque and rotational speed of the engine.

Then, in processing 104, fuel injection end timing ITe is obtained by adding an injection period to the fuel injection start timing ITs obtained in processing 103. The injection period is obtained as a time period necessary to inject the required quantity of fuel at the present fuel pressure detected by the fuel pressure sensor. The required quantity of fuel is obtained so that the air-fuel ratio (i.e., a ratio of the air mass charged in the combustion chamber, which is detected by the air flow sensor, to the fuel mass to be injected therein) becomes a predetermined value (for example, 12).

Then, the fuel injection end timing ITe obtained in processing 104 is compared with a predetermined fuel injection timing limit ITL (processing 105). Here, ITL is defined as timing slightly earlier than intake valve closing timing IVC (for example, ITL is defined as 210 degrees ATDC while IVC as 220 degrees ATDC). Further, it may be possible to change ITL according to the engine rotational speed, etc. instead of setting it to a constant fixed value. When the fuel injection end timing ITe is larger than the fuel injection timing limit ITL (i.e., when the end of fuel injection is later than the fuel injection timing limit ITL), processing 106 corrects the fuel injection start timing ITs and the fuel injection end timing ITe. Specifically, advance angle correction is made for the fuel injection start timing ITs and the fuel injection end timing ITe so that the fuel injection end timing ITe agrees with the fuel injection timing limit ITL while maintaining the fuel injection period.

When fuel injection is performed in the intake stroke with the above procedures, the combustion chamber is charged with air in the intake stroke, and at the same time, fuel is injected into the charged air, resulting in the fuel evaporation. When the fuel evaporates, the air temperature falls because the fuel draws the evaporation latent heat from the charged air, resulting in increased density of the air charged in the combustion chamber. Since the volume in the combustion chamber is fixed, it is possible to supply a larger quantity of air into the combustion chamber with increasing density. Accordingly, under a constant air-fuel ratio condition, it is possible to supply a larger quantity of fuel into the combustion chamber to make combustion. This makes it possible to increase engine power through the cooling effect by the evaporation latent heat of the fuel by injecting the fuel in the intake stroke.

The density of gas $\rho 0$ having initial temperature $T0$ and pressure P is represented by Formula 1 based on the equation of state.

$$\rho 0 = P/RT0 \qquad \text{(Formula 1)}$$

where R is the gas constant.

When the temperature of gas having initial temperature $T0$ and pressure P falls by $\Delta T$, a gas density $\rho 1$ is represented by Formula 2 based on the state equation of gas.

$$\rho 1 = P/R(T0-\Delta T) \qquad \text{(Formula 2)}$$

The temperature change $\Delta T$ by the fuel evaporation is represented by Formula 3.

$$\Delta T = mfLv/mgCp \qquad \text{(Formula 3)}$$

where mf is the mass of evaporated fuel, mg the mass of gas, Lv the evaporation latent heat, and Cp the isobaric specific heat of gas.

Formula 4 is obtained from Formulas 1 to 3.

$$\rho/\rho 0 = T0/(T0 - mfLv/mgCp) \qquad \text{(Formula 4)}$$

Figure 15:
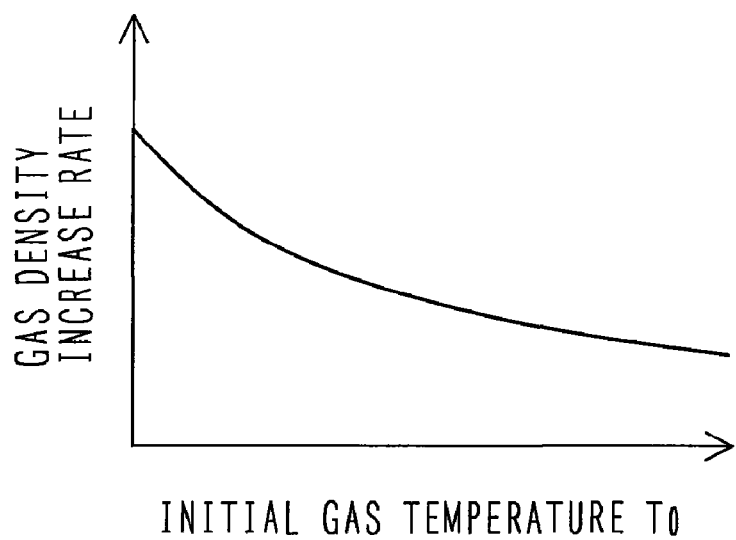
FIG. 15 is a graph showing the relation between gas density increase rates and initial gas temperatures.

Formula 4 denotes the rate of a density increase accompanying evaporative cooling caused by the fuel evaporation. FIG. 15 is a graph showing the dependence of the density increase rate represented by Formula 4 on an initial gas temperature $T0$. This graph denotes that the density increase rate after fuel evaporation increases with decreasing initial gas temperature.

Figure 16:
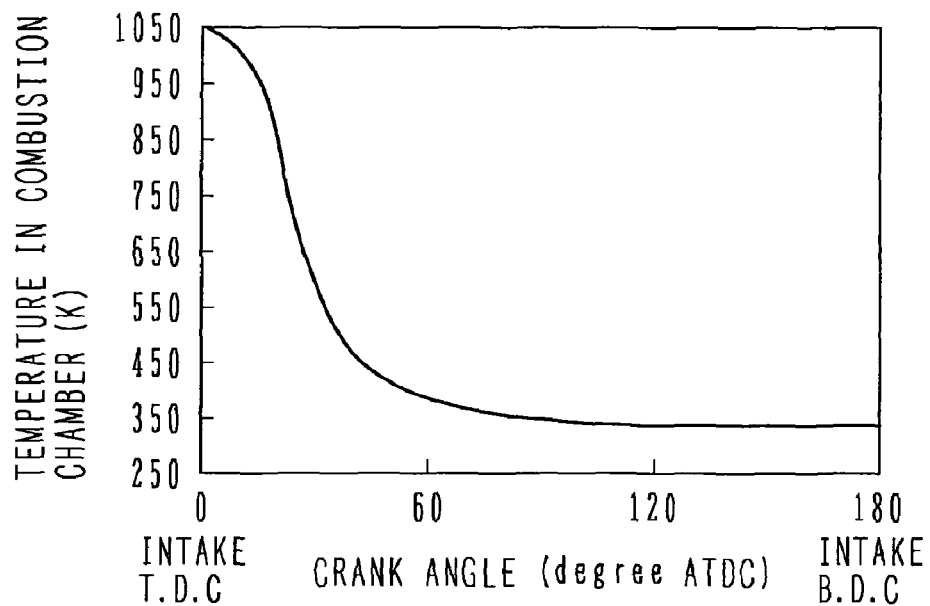
FIG. 16 is a graph showing the relation between gas temperatures in a combustion chamber and crank angles.

FIG. 16 shows an example of the time history of the gas temperature in the combustion chamber. At an early stage of the intake stroke, the gas temperature in the combustion chamber is very high because of the influence of a residual combustion gas in the combustion chamber. As the intake stroke progresses, air almost at a normal temperature (fresh air) is charged in the combustion chamber decreasing the gas temperature. The gas temperature in the combustion chamber becomes the lowest at the intake B.D.C.

In order to obtain more engine power by inhaling a larger quantity of air into the combustion chamber to fill it with the air in the intake injection mode, it is necessary to inject fuel at the timing with lower temperature in the combustion chamber. That is, the temperature in the combustion chamber in the intake stroke falls with time as shown in FIG. 16. Therefore, fuel injection is performed preferably at later timing in the intake stroke in order to obtain more engine power.

On the other hand, in order to increase the quantity of air pervading the combustion chamber by the evaporative cooling of fuel mentioned earlier, it is necessary to perform fuel injection while the intake valve is open. Specifically, even if the air is cooled by fuel evaporation after the intake valve closes, air inflow from the outside is stopped by the closed intake valve preventing an increase in the quantity of air to be filled in the combustion chamber. Therefore, it is desirable to set the fuel injection end timing earlier than the estimated time point passing the intake valve closing timing IVC by predetermined evaporation time.

In the case of fuels having lower lightness (i.e., lower evaporation time), it is necessary to inject fuel at earlier timing in the intake stroke in order to complete fuel evaporation before the intake valve closes. In the case of fuels having higher lightness (i.e., higher evaporation time), on the other hand, it is possible to almost complete fuel evaporation before the intake valve closes even if fuel injection is performed at later timing. As mentioned above, engine power can further be increased with later fuel injection timing in the intake stroke. Therefore, the higher the lightness of fuels, the higher engine power can be obtained by detecting the fuel lightness and making further retard angle correction for the fuel injection timing in the intake stroke. Further, by preventing the fuel injection end timing from being later than a time point passing the intake valve close timing IVC by a predetermined advanced crank angle, it is also possible to prevent the reduction of engine power, which may be caused by increased amount of fuel evaporation after the intake valve close timing IVC due to an excessively retarded angle for fuel injection timing.

Figure 17:
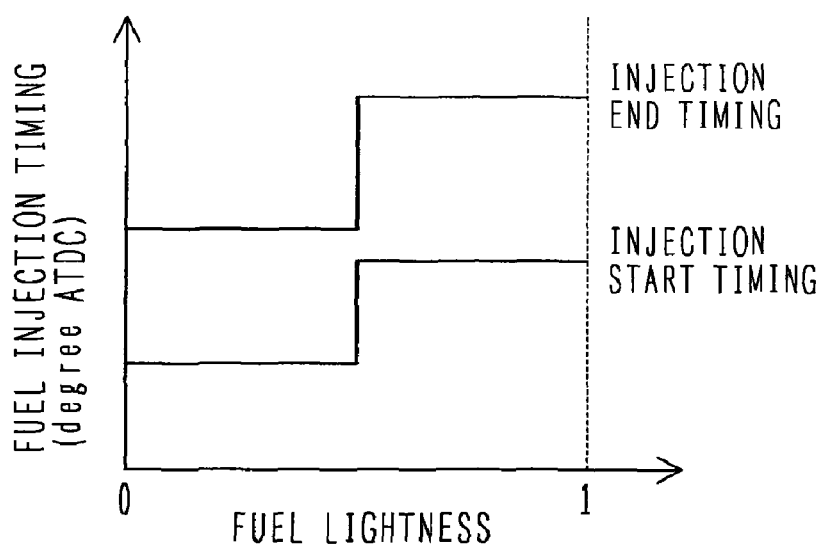
FIG. 17 is a diagram showing the relation between fuel injection timing and fuel lightness according to the first embodiment.

With the present embodiment, although the fuel injection timing is continuously changed according to continuous fuel lightness values as shown in FIG. 12, it may also be possible to discontinuously change the fuel injection timing. For example, as shown in FIG. 17, the same effect can be obtained by providing a threshold value of the fuel lightness and delaying stepwise the fuel injection timing when the fuel lightness is higher than the threshold value. In this case, since it is not necessary to detect the fuel lightness in a precise manner, this method is advantageous in that the determination of lightness is easy to control.

Figure 18:
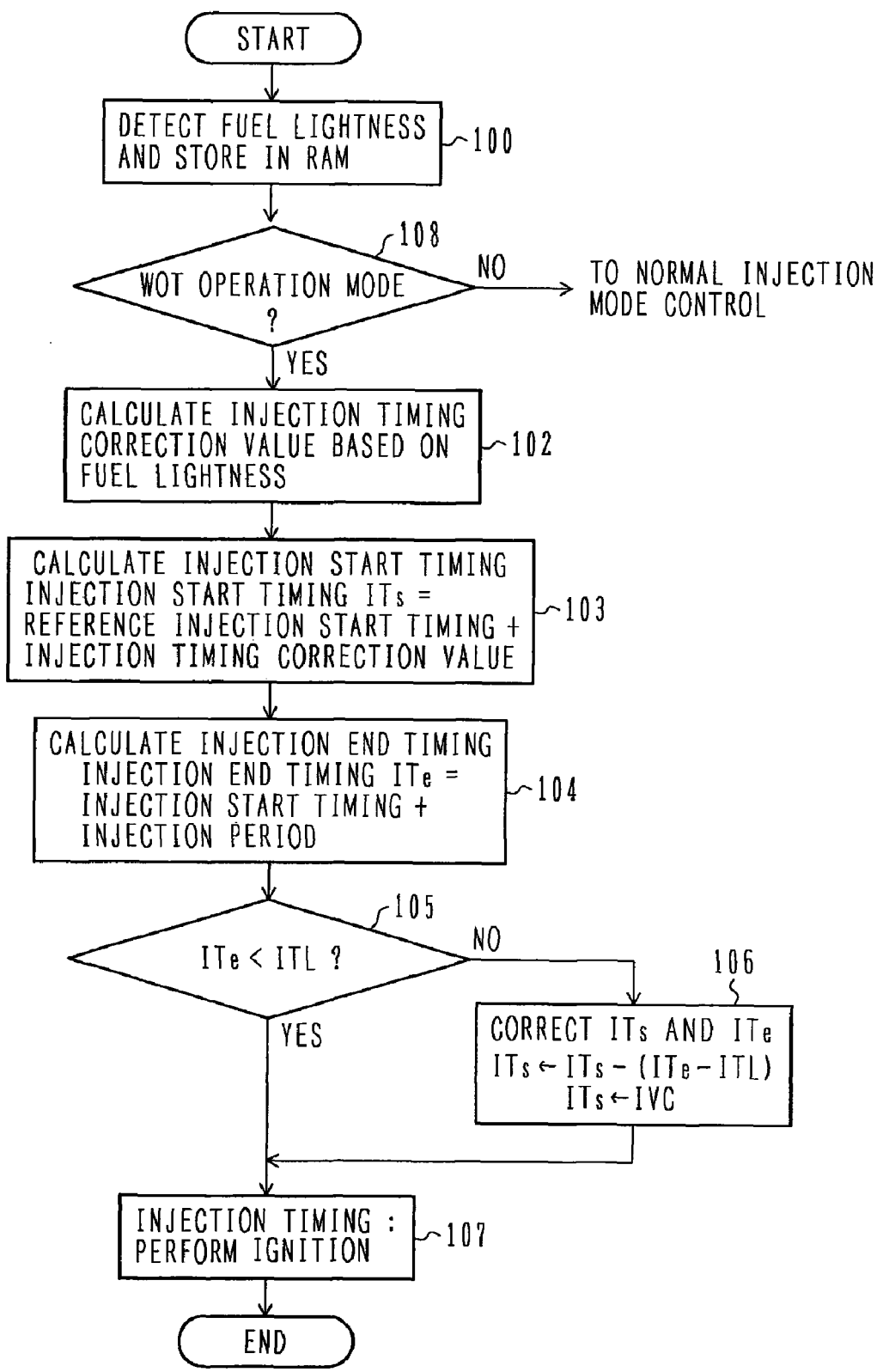
FIG. 18 is a flow chart of injection control according to a second embodiment.

With the present embodiment, engine power is improved by increasing the quantity of air to be filled in the combustion chamber by effective use of the evaporative cooling effect of fuel. Therefore, the effect is particularly high under the operating condition of a fully-opened throttle valve (Wide Open Throttle: WOT). Then, as shown in the processing flow of FIG. 18, it may be possible to determine whether the present mode is the WOT operation mode in processing 108 and, only in the WOT operation mode, to change the fuel injection timing according to the fuel lightness. If the present mode is judged to be a non-WOT operation mode in processing 108, the fuel injection timing remains unchanged. When the fuel injection timing is changed according to the fuel lightness in a partial load operation mode other than WOT, the engine power (torque) increases and the throttle opening for obtaining a predetermined required torque decreases in the case of lighter fuels. Then, there is a possibility that the throttling loss (pump loss) by the throttle increases resulting in degraded fuel efficiency. Therefore, by changing the fuel injection timing according to the fuel lightness only in the WOT operation mode, it is possible to prevent the fuel efficiency degradation at the time of partial loading while increasing the maximum engine torque.

Figure 19:
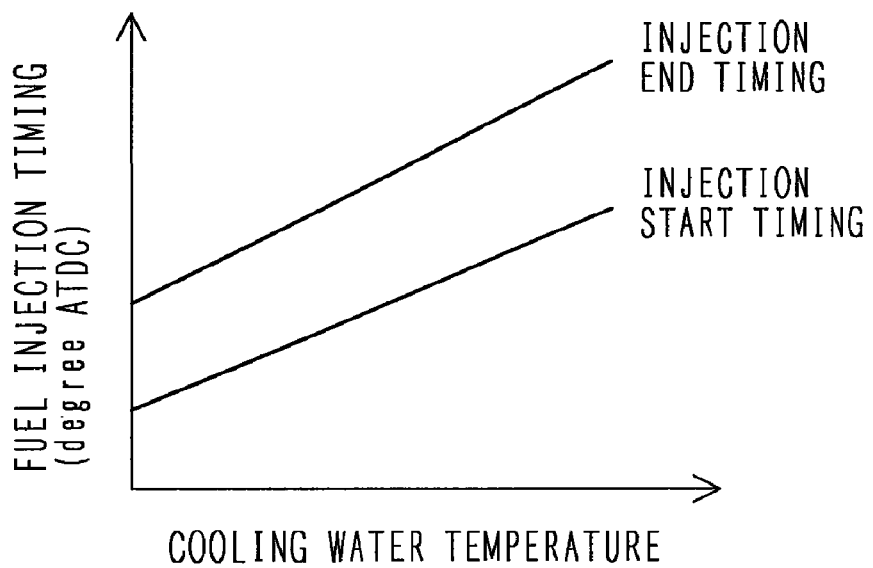
FIG. 19 is a graph showing the relation between fuel injection timing and cooling water temperature according to a third embodiment.

Instead of changing the fuel injection timing in relation to the fuel lightness, it may also be possible to change the fuel injection timing in relation to a parameter for changing the evaporation time of other fuels. As a parameter for changing the fuel evaporation time, for example, the engine cooling water temperature can be used. Specifically, the higher the cooling water temperature, the higher becomes the engine temperature and accordingly the easier for the fuel injected into the combustion chamber to evaporate. Then, as shown in FIG. 19, the engine power can be improved by detecting an engine cooling water temperature by use of a cooling water temperature sensor and delaying the fuel injection timing in the intake stroke injection mode with increasing cooling water temperature.

Figure 20:
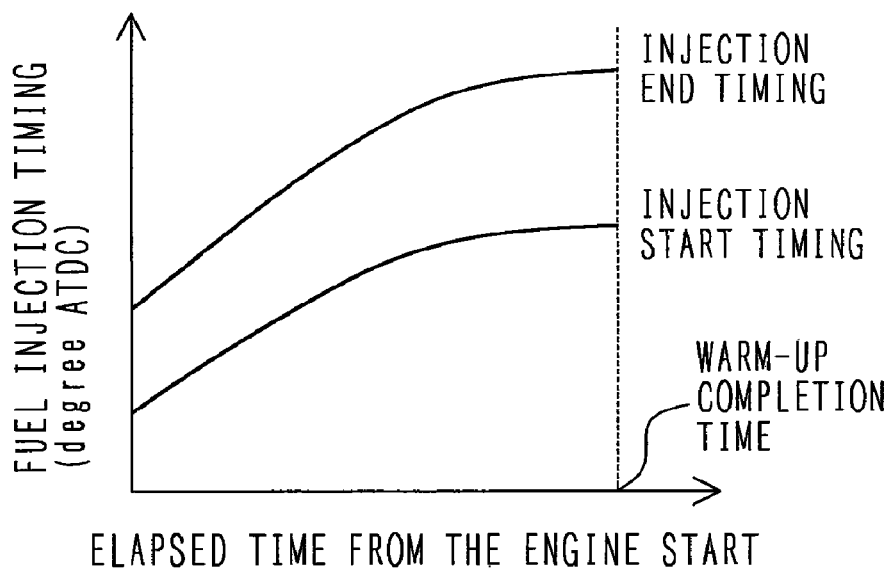
FIG. 20 is a graph showing the relation between fuel injection timing and elapsed time from the engine start according to a fourth embodiment.

The engine cooling water temperature is the lowest at a cold start of the engine, rises as the engine warms up, and then is maintained almost at a constant temperature (80 to 90° C.) after completion of warming up. Therefore, in the time interval from the engine start to the warm-up completion time, the engine power can be improved by delaying the fuel injection timing in the intake stroke injection mode in relation to the elapsed time from the engine start instead of engine cooling water temperature (refer to FIG. 20).

Figure 21:
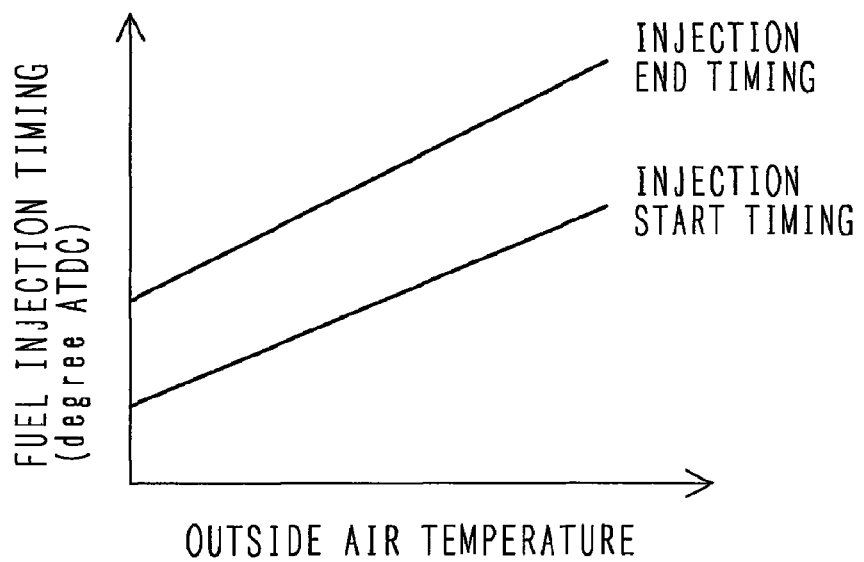
FIG. 21 is a graph showing the relation between fuel injection timing and outside air temperature according to a fifth embodiment.

As another parameter for changing the fuel evaporation time, for example, the outside air temperature can be used. Specifically, the higher the outside air temperature, the higher become the engine temperature, the intake gas temperature, and the fuel temperature and accordingly the easier for the fuel injected into the combustion chamber to evaporate. Then, as shown in the FIG. 21, the engine power can be improved by detecting an outside air temperature by use of an outside air temperature sensor and delaying the fuel injection timing in the intake stroke injection mode with increasing outside air temperature.

Figure 22:
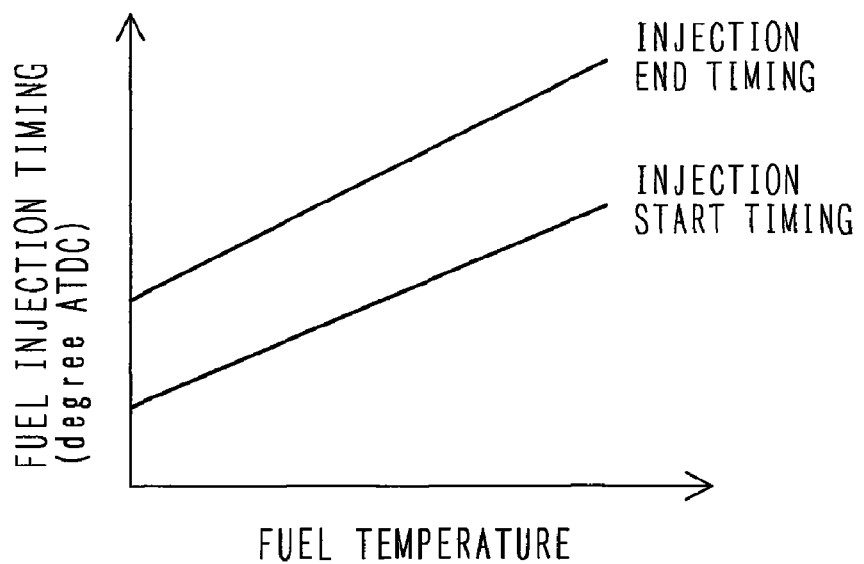
FIG. 22 is a graph showing the relation between fuel injection timing and fuel temperature according to a sixth embodiment.

As still another parameter for changing the fuel evaporation time, for example, the fuel temperature can be used. Specifically, the higher the fuel temperature, the easier for the fuel injected into the combustion chamber to evaporate. Then, as shown in the FIG. 22, the engine power can be improved by detecting a fuel temperature by use of a fuel temperature sensor and delaying the fuel injection timing in the intake stroke injection mode with increasing fuel temperature.

Figure 23:
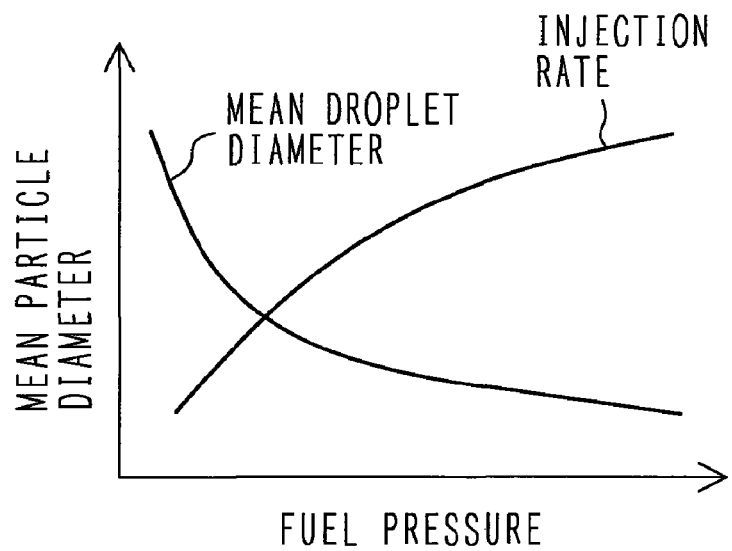
FIG. 23 is a graph showing the relation between mean droplet diameter of fuel spray and fuel pressure.
Figure 24:
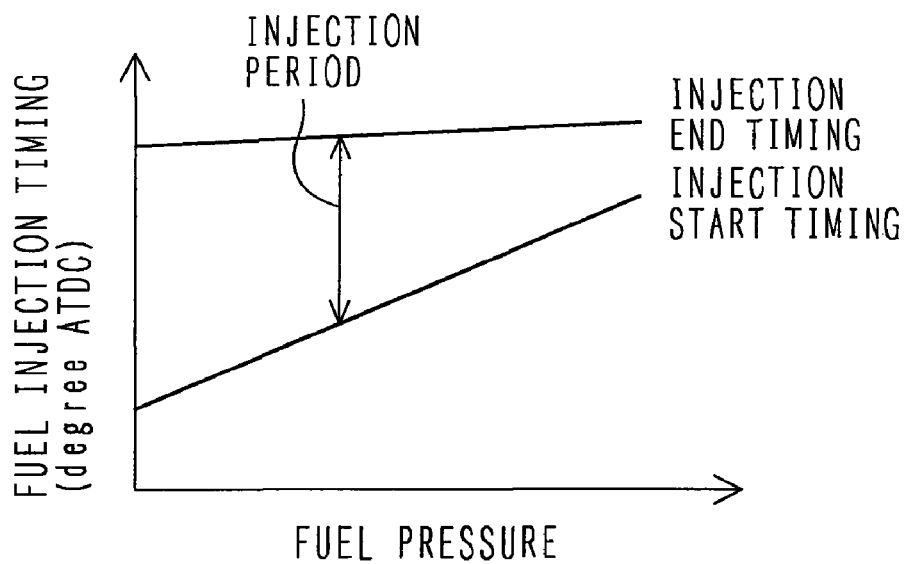
FIG. 24 is a graph showing the relation between fuel injection timing and fuel pressure according to a seventh embodiment.

As still another parameter for changing the fuel evaporation time, for example, the fuel pressure can be used. Generally, the droplet diameter of a fuel spray injected from the injector decreases with increasing fuel pressure as shown in FIG. 23. Specifically, the higher the fuel pressure, the easier for the fuel injected into the combustion chamber to evaporate. Then, as shown in FIG. 24, a fuel pressure is detected with a fuel pressure sensor, and the fuel injection timing in the intake stroke injection mode is then delayed with increasing fuel pressure. Since the rate of fuel injection from the injector (injection quantity per unit time) increases with increasing fuel pressure as shown in FIG. 24, if the fuel pressure rises, the injection period necessary to inject a predetermined fuel quantity decreases. Therefore, the change rate of the injection end timing in relation to the fuel pressure is smaller than that of the injection start timing in relation to the same.

Figure 25:
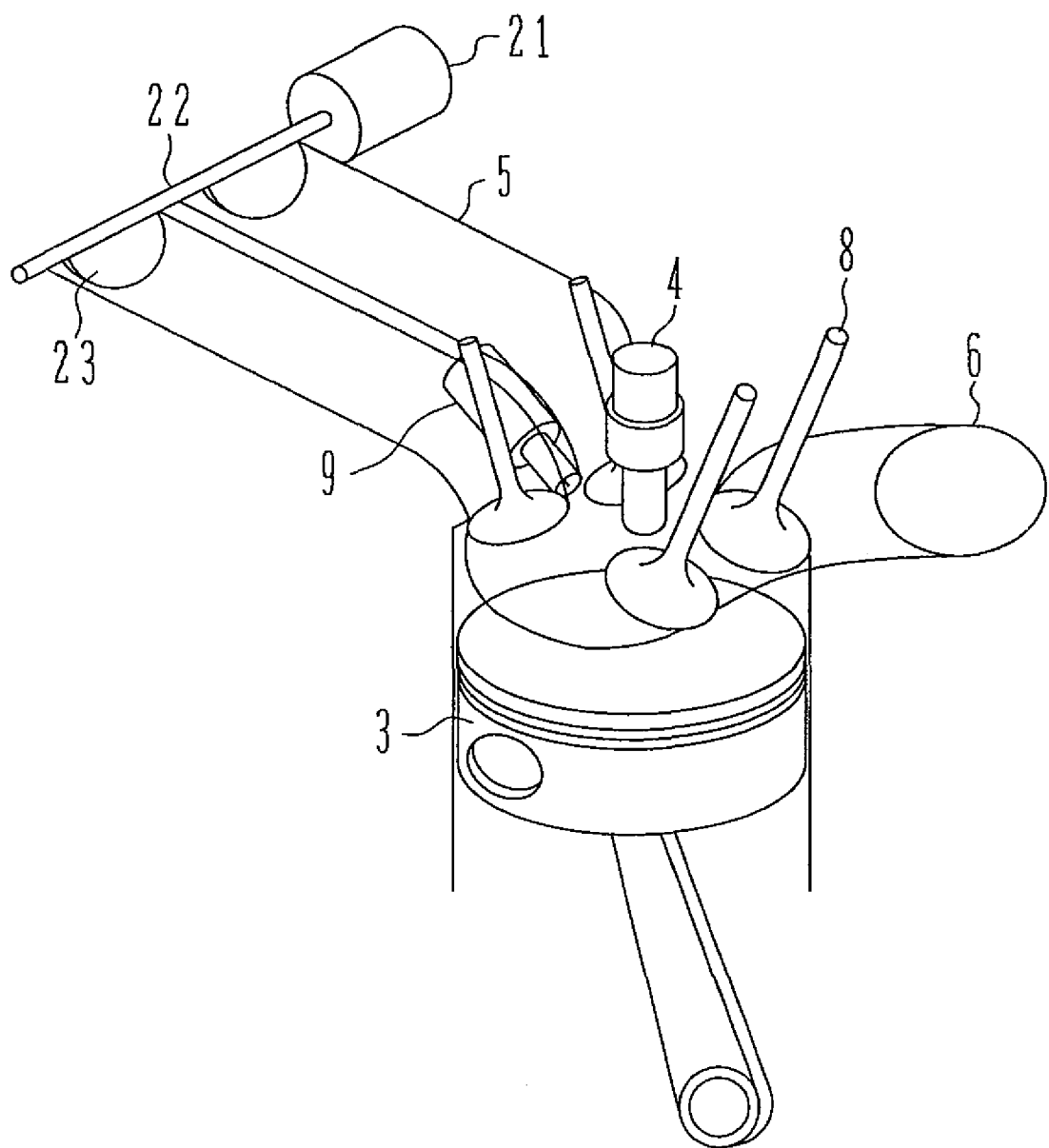
FIG. 25 is a perspective view of an engine according to an eighth embodiment.

A technique for providing a tumble control valve or a swirl control valve in the intake port of the engine to intensify air flow in the combustion chamber is known. FIG. 25 is an example of an engine configuration wherein a tumble control valve is provided. In FIG. 25, a tumble control valve is provided on an upstream side of the intake port 5. The structure of the tumble control valve is such that semicircular plates 23 are attached to a swinging shaft 22 of a motor 21. The semicircular plates 23 swing around the swinging shaft 22 based on a command from the ECU (not shown). When the tumble control valve is open as shown in FIG. 26, air enters the combustion chamber through the entire section of the intake port; therefore, bi-directional longitudinal vortexes (tumbles) are generated in the combustion chamber. In this case, the vortexes cancel each other, damping the entire vortex flow in the combustion chamber. On the other hand, when the tumble control valve is closed, air enters the combustion chamber through the upper half section of the intake port; therefore, a strong unidirectional longitudinal vortex is generated in the combustion chamber. In this case, the strong longitudinal vortex violently interferes with fuel sprays injected into the combustion chamber, promoting atomization and evaporation of the fuel sprays. This makes it possible to change the fuel evaporation time in the combustion chamber by means of the opening of the tumble control valve.

Figure 27:
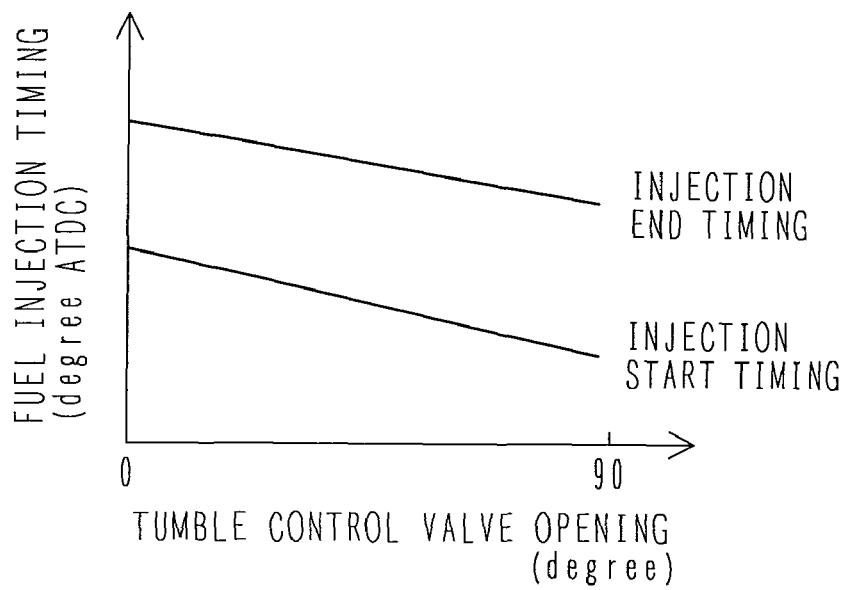
FIG. 27 is a graph showing the relation between fuel injection timing and opening of a tumble control valve according to the eighth embodiment.

Then, as still another parameter for changing the fuel evaporation time, for example, the opening of the tumble control valve can be used. Specifically, the smaller the opening of the tumble control valve (i.e., the higher the intensity of tumbles in the combustion chamber), the easier for the fuel injected into the combustion chamber to evaporate. Then, as shown in FIG. 27, the engine power can be improved by delaying the fuel injection timing in the intake stroke injection mode with decreasing opening of the tumble control valve.

Although the tumble control valve which generates longitudinal vortexes in the combustion chamber has been described above, the same effect as that of the tumble control valve can also be obtained by performing the same control on a swirl control valve which generates lateral vortexes (swirls) in the combustion chamber.

Second Embodiment

Then, an embodiment using mixed gasoline will be explained below.

Figure 28:
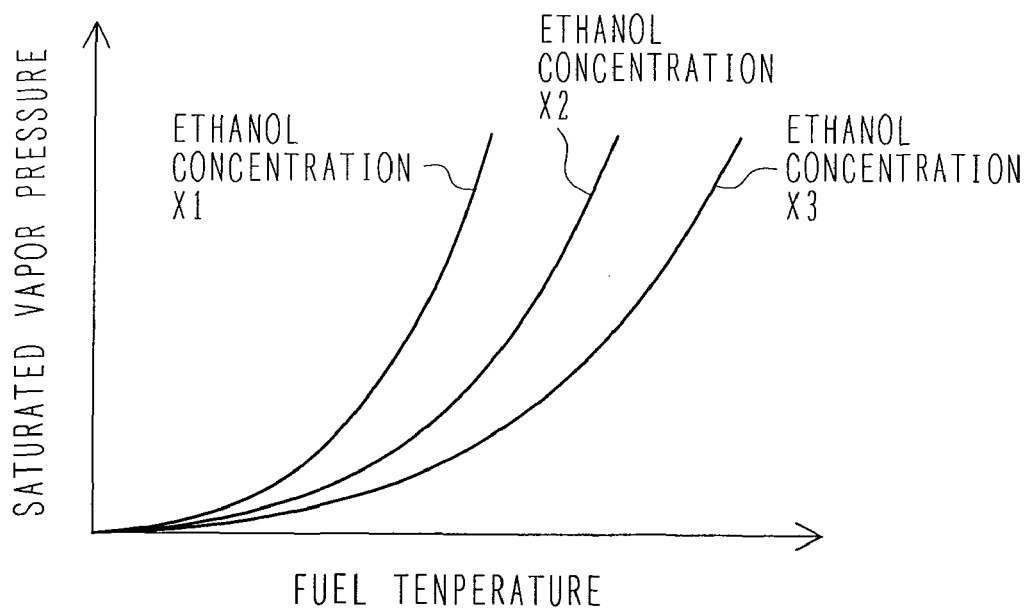
FIG. 28 is a graph showing the relation between saturated vapor pressure and fuel temperature of ethanol-blended gasoline.
Figure 29:
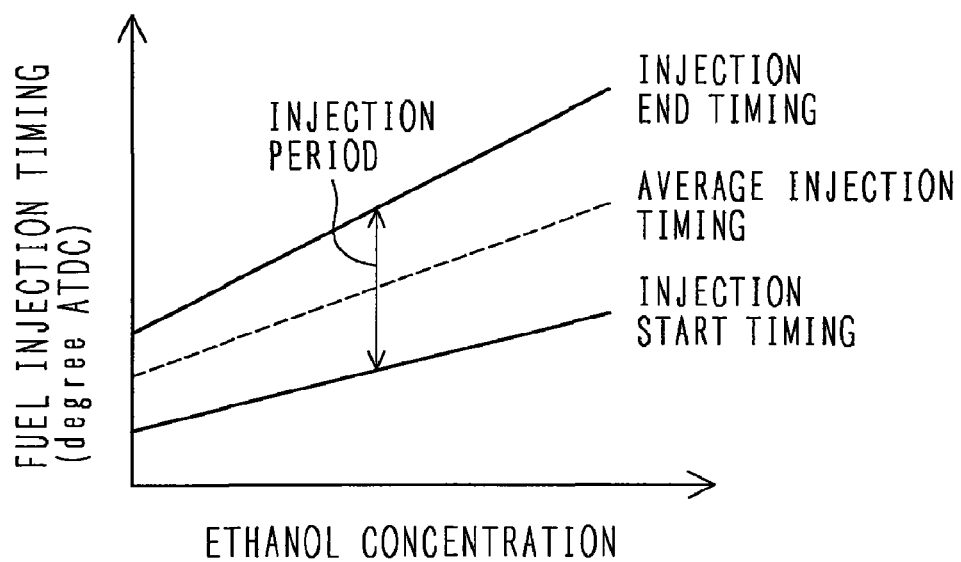
FIG. 29 is a graph showing the relation between fuel injection timing and ethanol concentration according to a ninth embodiment.
Figure 30:
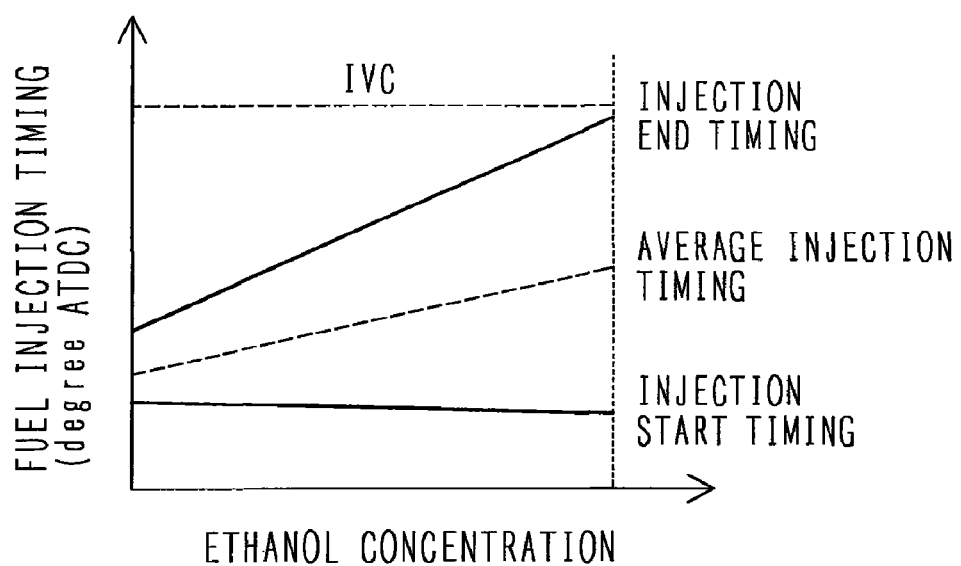
FIG. 30 is a graph showing the relation between fuel injection timing and ethanol concentration according to the ninth embodiment.

Ethanol-blended gasoline is known as a mixed fuel. Since each saturated vapor pressure differs between ethanol and gasoline, the saturated vapor pressure of the mixed fuel depends on the concentration of mixed ethanol as shown in FIG. 28. Generally, the saturated vapor pressure of the mixed fuel increases with increasing ethanol concentration. This means that the fuel evaporation time increases with increasing ratio of mixed ethanol. Then, as shown in the FIG. 29, the engine power can be improved by detecting a concentration of ethanol contained in the fuel and delaying the fuel injection timing in the intake stroke injection mode with increasing ethanol concentration. In connection with detection of the ethanol concentration, disclosures, for example, in JP-A-2006-77683 can be utilized. The calorific value per unit mass of ethanol is smaller than that of gasoline. Therefore, in order to obtain the same calorific value, it is necessary to inject a more quantity of ethanol-blended fuel than the quantity of gasoline to solely be injected. Therefore, as shown in FIG. 29, the injection period increases with increasing ethanol concentration. In order to increase the quantity of air to be filled in the combustion chamber by the evaporation latent heat effect of fuel, it is necessary that the fuel injection end timing be earlier than the valve closing timing of the intake valve (IVC). On the other hand, a required quantity of fuel increases with increasing ethanol concentration, which lengthens a fuel injection period. Therefore, as shown in FIG. 30, the fuel injection start timing may be made earlier with increasing ethanol concentration. Also in this case, the engine power can be improved by delaying intermediate timing of the fuel injection start and end timing (i.e., average fuel injection timing) with increasing ethanol concentration.

The present invention provides a fuel injection control method and a fuel injection controller preferably used for a direct injection internal combustion engine. The present invention is not limited to the types of injector, presence or absence of an air flow mechanism in the cylinder, attachment position of the injector (side injection or center injection), and fuel injection method (single injection or multiple injections), and is widely applicable in combination with each other.

What is claimed is:

1. A control device of a direct injection engine, which injects fuel directly into a cylinder at least in an intake stroke and then ignites evaporated fuel therein, wherein:
    the control device comprises evaporation speed detecting means for detecting an evaporation speed by detecting a component of the fuel;
    and the fuel injection timing is set toward the end of the intake stroke when the evaporation speed detected by the evaporation speed detecting means is large at the time of a driving operation so that a throttle valve that controls an air amount supplied into the cylinder is fully opened.

2. The control device according to claim 1, wherein the control device corrects fuel injection starting timing so as to stop the fuel injection before the closing timing of an intake valve.

3. A control device of a direct injection engine, which injects fuel directly into a cylinder at least in an intake stroke and then ignites evaporated fuel therein, wherein:
    the control device comprises judging means for judging fuel lightness;
    and the fuel injection timing is set closer to the end of the intake stroke when the fuel lightness is low at the time of a driving operation so that a throttle valve that controls an air amount supplied into the cylinder is fully opened.

4. The control device according to claim 3, wherein the control device corrects fuel injection starting timing so as to stop the fuel injection before the closing timing of an intake valve.

5. A control device of a direct injection engine, which injects fuel directly into a cylinder at least in an intake stroke and then ignites evaporated fuel therein, wherein:
    the control device comprises component detecting means for detecting a component of mixed fuel;
    and the fuel injection timing is set toward the end of the intake stroke when the mixed rate of ethanol in the mixed fuel detected by the component detecting means is high at the time of a driving operation so that a throttle valve that controls an air amount supplied into the cylinder is fully opened.

6. The control device according to claim 5, wherein the control device corrects fuel injection starting timing so as to stop the fuel injection before the closing timing of an intake valve.

* * * * *